United States Patent [19]

Bourner

[11] 4,285,391
[45] Aug. 25, 1981

[54] ELECTRICAL SYSTEM FOR FOOD SERVICE DEVICES

[75] Inventor: Howard Bourner, Nashville, Tenn.

[73] Assignee: Aladdin Industries, Incorporated, Nashville, Tenn.

[21] Appl. No.: 70,680

[22] Filed: Aug. 29, 1979

[51] Int. Cl.³ .............................................. F25B 29/00
[52] U.S. Cl. ........................................ 165/30; 165/61; 165/DIG. 26; 312/236; 186/45; 219/386; 219/521; 219/387; 219/403; 219/447; 219/518
[58] Field of Search ....................... 165/48, 58, 61, 64, 165/30; 219/385, 386, 387, 400, 403, 404, 447, 518, 521; 312/236; 186/38-46

[56] References Cited

U.S. PATENT DOCUMENTS

| | | | |
|---|---|---|---|
| 3,608,627 | 9/1971 | Shevlin | 165/30 X |
| 3,908,749 | 9/1975 | Williams | 165/61 X |
| 3,965,969 | 6/1976 | Williamson | 165/64 X |
| 4,019,022 | 4/1977 | Seider et al. | 219/386 |
| 4,041,277 | 8/1977 | Shumrak et al. | 219/386 |
| 4,068,115 | 1/1978 | Mack et al. | 219/386 |
| 4,093,041 | 6/1978 | Davis et al. | 219/386 X |
| 4,103,736 | 8/1978 | Colato et al. | 165/48 R |
| 4,110,587 | 8/1978 | Souder et al. | 219/386 X |
| 4,156,456 | 5/1979 | Müller | 165/48 R |
| 4,203,486 | 5/1980 | Rubbright et al. | 165/48 R |

Primary Examiner—Albert W. Davis
Assistant Examiner—Margaret A. Focarino

[57] ABSTRACT

A food service device including a food-carrying cart which can be stored inside a refrigerator is provided with elements for heating the food before meals are served. The electrical system is comprised of switching devices which actuate the heating elements depending upon the presence and orientation of food trays on the shelf of the cart; a self-aligning coupling which can supply electrical power to the cart's heaters when the cart is placed in the refrigerator; and a timer which controls the duration of time the electrical heaters are energized to warm the food prior to service, and provide a keep-warm timing sequence for holding the heated food within a refrigerated environment.

8 Claims, 12 Drawing Figures

ELECTRICAL SYSTEM FOR FOOD SERVICE DEVICES

BACKGROUND OF THE INVENTION

The present invention relates generally to food storage and rethermalization systems. In particular, it relates to systems used with food service carts which are loaded with trays of precooked meals and refrigerated to preserve the meals until time for service and are then heated to rethermalize the meals.

In the food service industry it is often desirable to prepare a large number of a variety of meals which can be stored in refrigerators for eventual service a day or more in the future. Some of the refrigerated foods such as meats and vegetables should be heated to high temperatures before serving while other foods such as fruits, salads and dessert should remain chilled. In many cases, a variety of meals must be made available to allow for the diners' individual tastes. In specific circumstances, especially hospitals, diets must be controlled, thus necessitating an even greater variety of meals which must be preserved and later served.

One known way of rethermalizing the precooked meals after refrigerated storage is by use of a cart which is provided with a separate means for heating selected compartments within trays that are to be used to serve the meals. When the meals are initially assembled, the courses which will require heating can be placed in the compartments which can be heated. Foods which should not be heated can be placed in nonheatable compartments. Hence, whether a dish is to be heated or not is determined when a member of the kitchen staff places the food in a specific compartment or container of a tray.

Such a method of heating the individual compartments is disclosed in U.S. Pat. No. 4,005,745 to Colato et al and French Patent No. 1,219,352 to Tricault. The serving tray is provided with covered containers which can be inserted into a specified opening extending through a tray. When the tray is inserted into a cart for storage in a refrigerator, the bottom of the specified containers are disposed on heating elements which act to lift the containers out of contact with the surface of the tray. When the meal is to be heated, an electric current is provided to the heating elements by a manually operated switch. Since the specified containers are covered and out of contact with the tray, very little heat is transferred to any other unheated container on the tray and thus other courses remain chilled.

In the systems known to the applicant, the personnel reheating the food must manually operate a switch to heat the various compartments which are to be rethermalized. Thus the personnel assembling the meals must record an extensive list of the trays which need heating in order to provide the servers with information as to which switches should be thrown to heat the proper containers. Alternatively, the servers must inspect every compartment of every tray to determine whether the electrical heater must be switched on. Either of these operations can consume time and provide opportunity for costly human error.

Hence, it is an object of this invention to provide an electrical system for a food service apparatus in which the food assembler can determine at the time he inserts the tray into the cart whether selected compartments of the tray are to be eventually reheated.

A further disadvantage to the use of manually operated switches is in the possibility that switches associated with unoccupied shelves may be left in an "on" position. Not only does this waste electricity but the heat generated by the areas on these unoccupied shelves may be transmitted to the chilled food in adjacent food trays.

Hence, it is a further object of this invention to provide an electrical system for food service devices in which the absence of a tray on a given shelf will render the heating areas for that shelf inoperative.

In the rethermalization of the meals which have been stored in the refrigerator it is necessary to apply heat for a predetermined period of time. Furthermore, it is desirable to allow the food to stand for a short duration following the heating but before the service of the meals. All the meals in the cart can be ruined if heat is not applied for the correct duration of time, or if the food is allowed to stand too long before service.

Hence, it is an object of this invention to provide an electrical system for a food service device which can automatically control the duration of time for which the food is to be heated and allowed to stand before service or to keep warm for a predetermined period of time.

Because food rethermalization systems use electricity for heating it is essential that the necessary electricity be supplied in a manner that is safe and desirable so that the users of such equipment have no or a minimum of difficulty in establishing the electrical connection.

Therefore it is another object of this invention to provide a novel food rethermalization, including means for simply and safely establishing necessary connections.

BRIEF DESCRIPTION OF THE INVENTION

The foregoing and other objects of the invention are achieved by providing a refrigerator and rolling food cart with a heating system, including control switches proximate to each shelf to sense the orientation of a food tray and operate automatically in response to that orientation, a self-aligning electrical coupling between the food cart and the refrigerator, and a timer which will control the timing sequence for which the electrical heaters under the food trays are energized.

A BRIEF DESCRIPTION OF THE DRAWINGS

The invention itself is set forth in the claims appended hereto and forming a part of this specification, while an understanding of an embodiment thereof may be had by reference to the detailed description taken in conjunction with the drawings in which:

DETAILED DESCRIPTION

The embodiment of the invention herein disclosed can be analyzed as having three interacting aspects. The first is the self-aligning electrical coupling system which provides a connection between the refrigerator electrical system and the cart's electrical system. The second is the tray activated electrical heating circuits which are affiliated with each shelf on the rolling cart. The final is one which times the duration for which power is applied to the cart and also sounds an alarm when the food is ready to be served.

Figure 1:
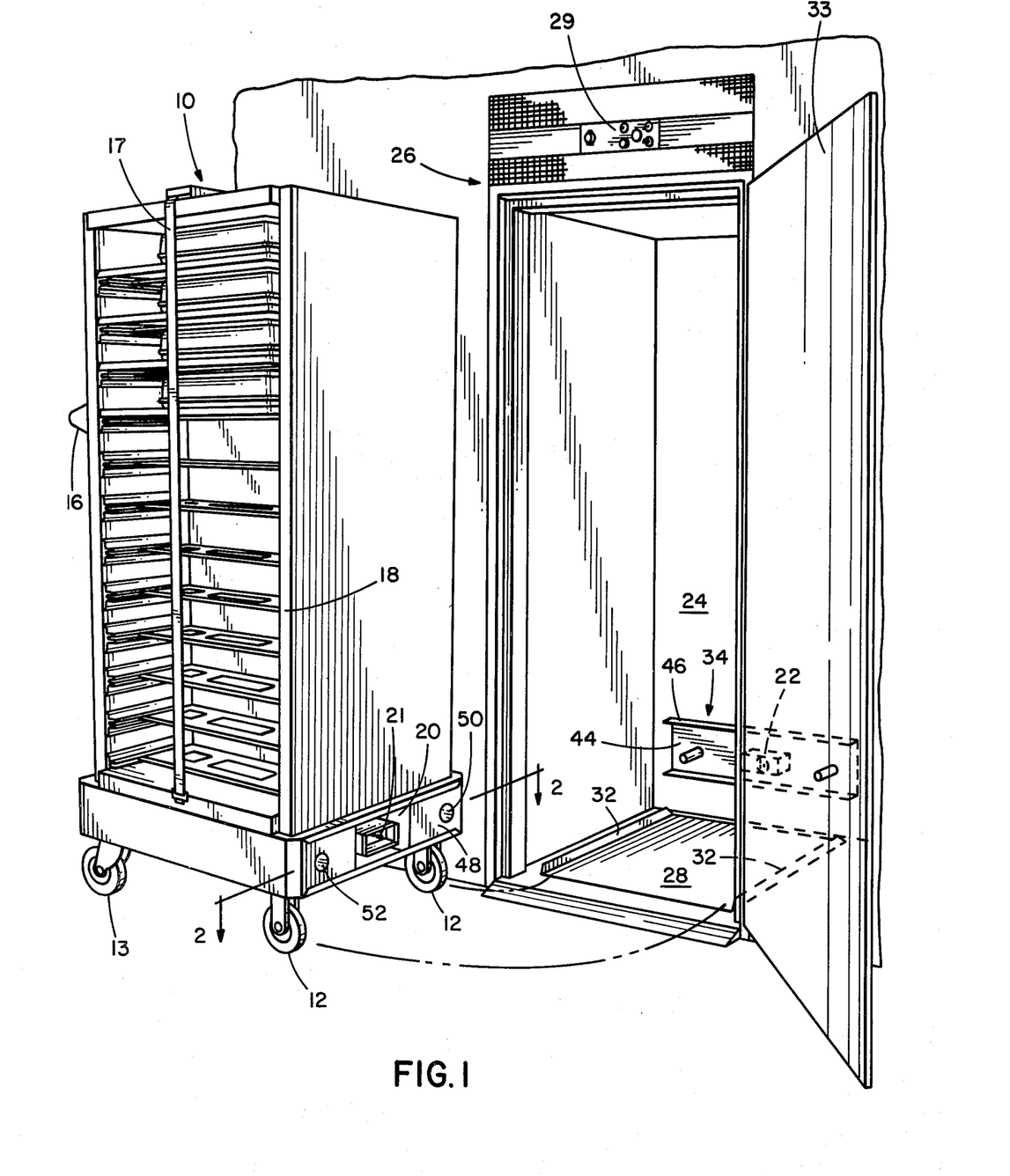
FIG. 1 is a perspective view of the preferred embodiment of the invention.

Referring first to FIG. 1, an embodiment of the invention is illustrated. Portions of all three aspects are visible in this illustration. A cart 10 is provided with fixed front wheels 12 as well as steerable and lockable rear wheels, only one of which can be seen at 13. The cart may also be provided with foldable rack 14 (see FIG. 8). A handle 16 is provided for use by an operator. A strap 17 extends over the front opening of the cart 10 and may be retracted to load trays or extended to hold trays therein when the cart is in motion. Spaced throughout the height of the cart are a plurality of shelves 18, each provided with one or more heating elements to be described in greater detail hereinafter. An opening 20 in the base of the cart provides access to a male electrical connector 21 which is engageable in a matching female connector 22 provided on the rear wall 24 of a refrigerator 26.

The refrigerator itself is dimensioned to receive the cart and is provided with guide plate 28 on its floor. The guide plate is provided with two upright guide flanges 30 and 32 and may be attached to the bottom of the refrigerator by any suitable means. A control panel 29 is mounted on the front face of the refrigerator which also includes a conventional door 33.

To provide a connection between the refrigerator electrical system and the electrical system in the cart a self-aligning coupling is provided. This connection is to be established by the act of inserting the cart into the refrigerator. The main electrical contact is provided by the male and female sections of the connector, while an additional ground connection is provided by the contact of the mechanical portions of the coupling. The mechanics of the coupling system also insure that the two connectors are properly aligned.

Figure 2:
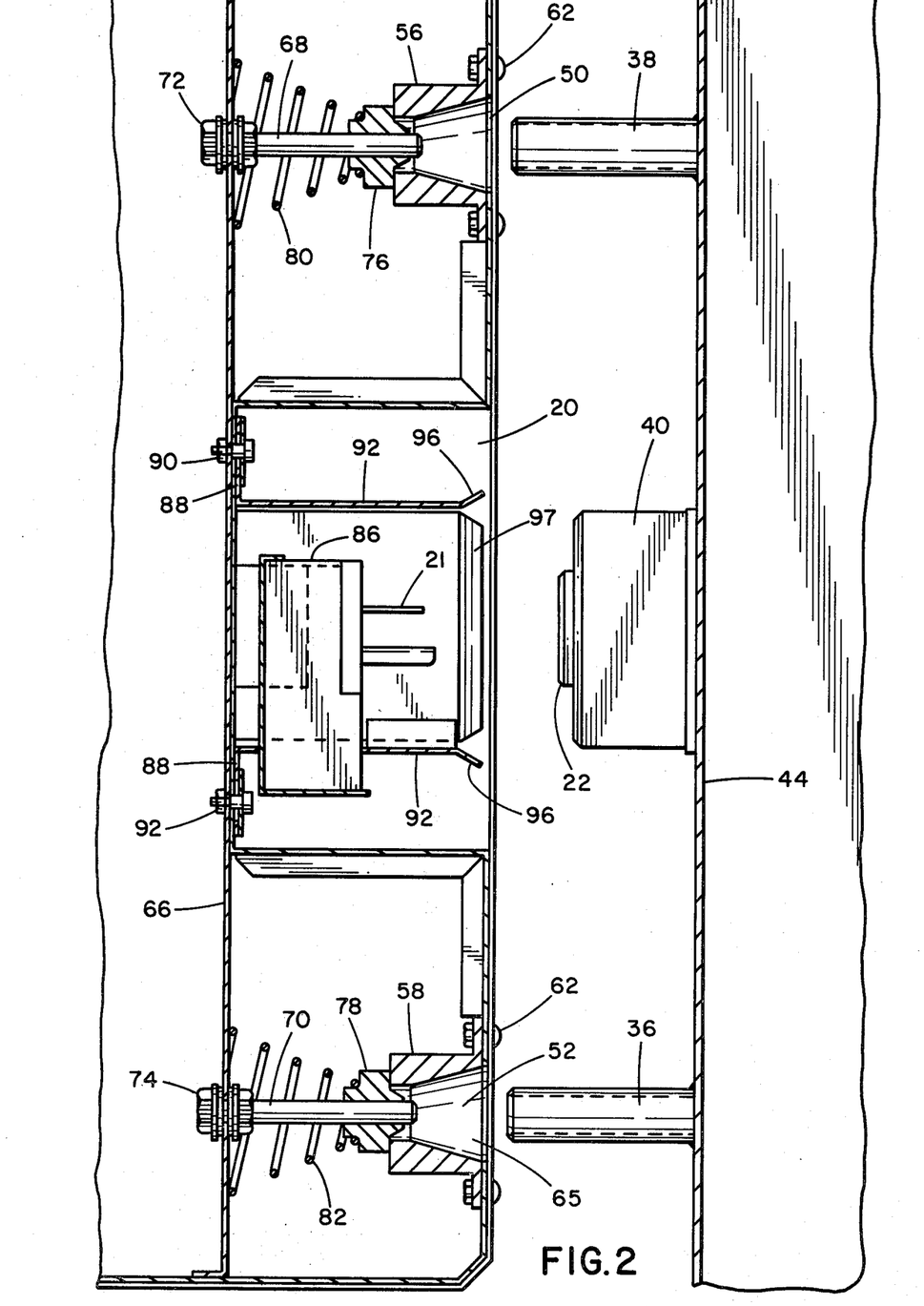
FIG. 2 is a cross-sectional view taken along line 2—2 of FIG. 1 showing the positions of the self-aligning coupling in an unmated orientation.
Figure 3:
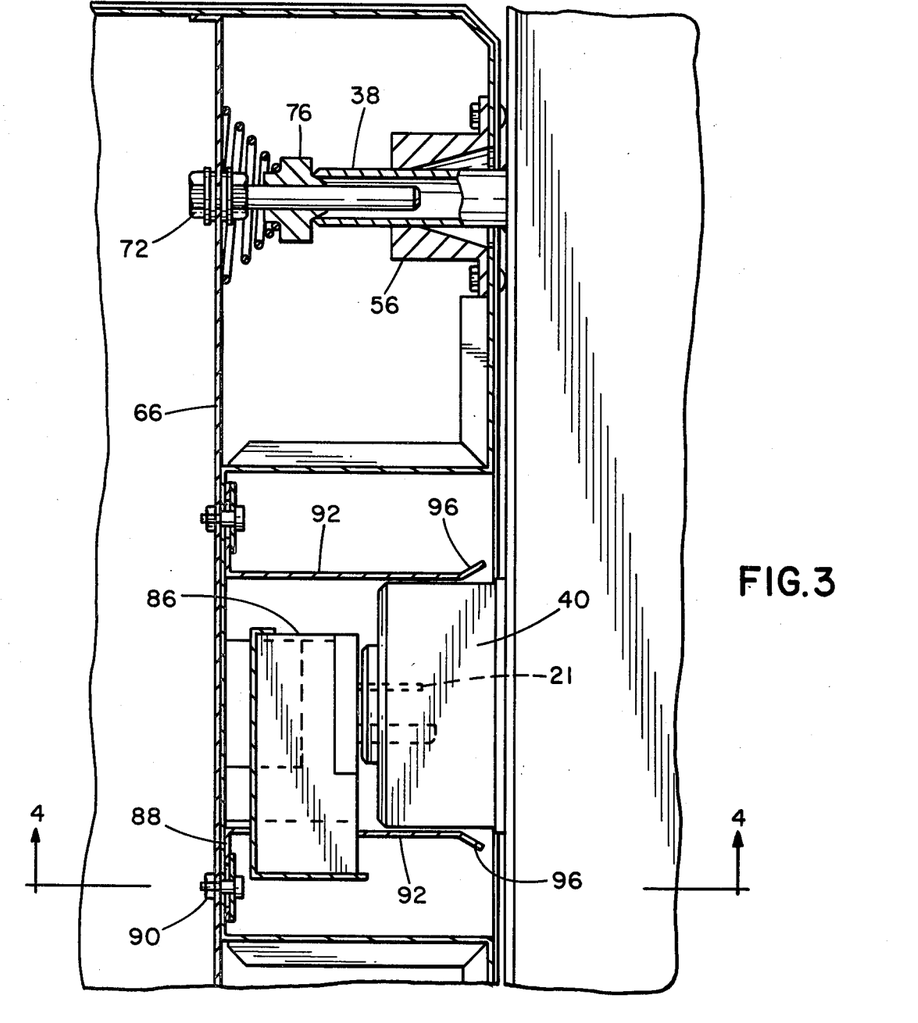
FIGS. 3 and 4 are cross-sectional views of a portion of the self-aligning coupling showing the cart and refrigerator in a mated orientation.
Figure 4:
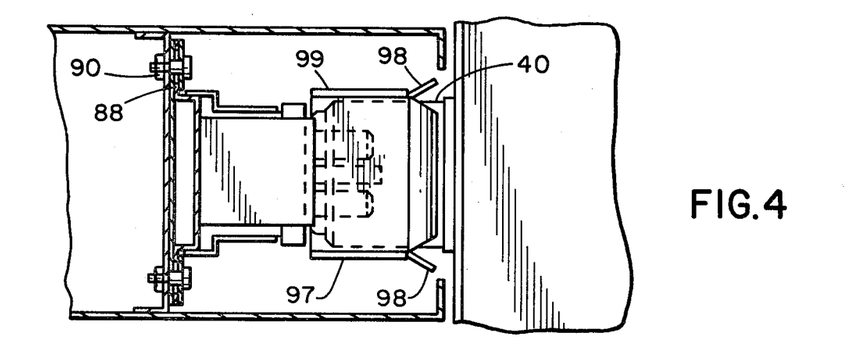
Figure 5:
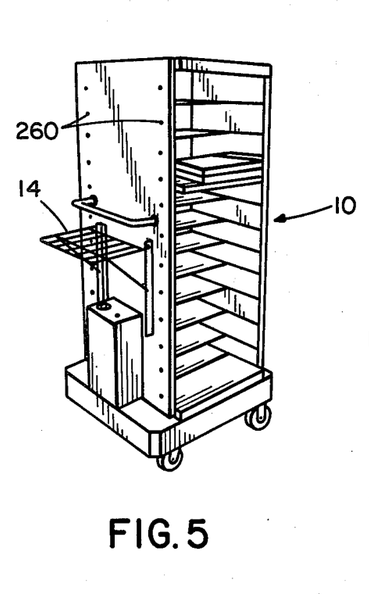
FIG. 5 is a perspective view of the cart.
Figure 6:
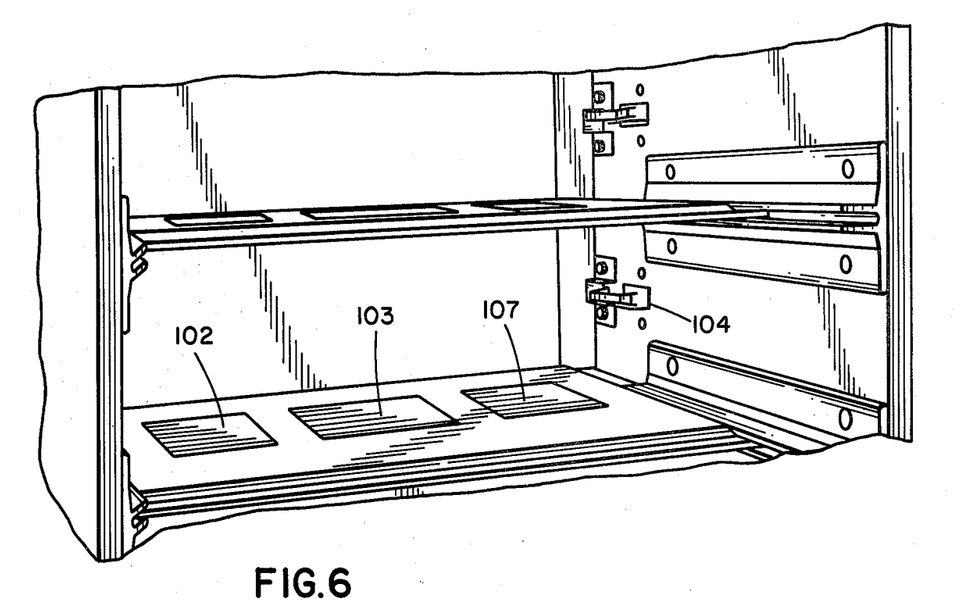
FIG. 6 is a cross-sectional view of the shelves in the cart.

Referring now to FIGS. 2, 3 and 4, views of the self-aligning coupling system show the refrigerator section 34 which is comprised of hollow alignment tubes 36 and 38, electrical box 40 and the female power connector 22. The tubes and box are mounted on the web 44 of channel 46. This channel may be attached to the rear wall of the refrigerator by any other suitable means. The electrical connections to the female outlet are provided through the rear wall of the refrigerator.

The other half of the self-aligning coupling is located in the base of the cart. The cart has a base plate 48 which is provided with circular openings 50 and 52 as well as the rectangular opening 20. These openings are dimensioned so that they will align with and receive the hollow alignment tubes 36 and 38 as well as electrical box 40. Tapered alignment bushings 56 and 58 are located within the base of the cart and are mounted at the circular opening by means of threaded fasteners 60 and 62. A support plate 66 is mounted in the base of the cart spaced from the openings 20, 50 and 52. Alignment pins 68 and 70 are threaded at one end and attached to the support plate 66 by means of nuts 72 and 74. Sliding bushings 76 and 78 are mounted on the pins 68 and 70 and are urged against the alignment bushings 56 and 58 by means of springs 80 and 82.

Mounted within the opening 20 and supported on the plate 66 is a male electrical connector 21 extending from the electrical box 86. The electrical box is attached to the interior plate 66 by means of flanges 88 and threaded fasteners 90. The fasteners and the holes in which they are mounted are dimensioned to allow the flanges, electrical box, and electrical connector to move over limited dimensions in a plane parallel with the plane of the interior plate 66. Extending from the flanges 88 are side guide walls 92 and top and bottom guide walls 94, each provided with outwardly flared ends 96 and 98, respectively. When the cart is rolled into the refrigerator the leading edges of the electrical box 40 will initially contact the flared ends 96, 98, and to the extent there is any misalignment the electrical box 86 and its male connectors 21 can move to engage the female connector 22.

The alignment of the plugs should be considered to take place in three stages, each stage being associated with a different set of devices within the system. First, when the cart is initially rolled into the refrigerator, the wheels of the cart are directed by the floor plate's guide flanges 32. This insures that the cart is inserted in an orientation perpendicular to the rear wall.

The second stage of alignment is when the cart is inserted so far into the refrigerator that the alignment tubes 36 and 38 engage the alignment bushings 56 and 58. The tapered surfaces of the bushings initially compel any necessary lateral movement of the cart so that the alignment tubes engage over the alignment pins. As the cart is further pushed toward the back of the refrigerator, the alignment tubes will engage the spring-loaded bushings 76 and 78, thus assuring grounding integrity. Further movement of the cart causes the alignment rods 36, 38 to move along the pins 68, 70 to assure that the neutral pin is engaged prior to any engagement of the male blades of the connectors with the mating female receptacle.

The third alignment process is by the action of the floating male connector 21. If there is a slight misalignment of the electrical connectors, the flanges 88 upon which the electrical box 86 is mounted will shift along the supporting plate 66. This will prevent any bending of the electrical contacts due to misalignment resulting from deformation of the cart because of rough use or variations in tolerances during the manufacture of the cart.

The alignment tubes and bushings are dimensioned so that the additional ground connection is established before the connectors engage each other. This insures that the body of the cart is grounded before any potentially dangerous electrical connection is made.

When the cart is fully inserted into the refrigerator, the electrical connectors will automatically be mated as shown in FIGS. 3 and 4. Once these connections have been achieved, the refrigerator door may be closed since no further coupling between the cart and the refrigerator is necessary.

Referring now to FIGS. 5 through 11, another aspect of the system is illustrated. This includes the cart 10 which is equipped with heated shelves 18. Each shelf is provided with electrical heating areas such as those shown at 102, 103 and 107 (FIG. 6) and an associated two pole switch 104 is provided on the side wall of the cart. As can best be appreciated from FIG. 8, each tier of the cart can include two shelves 105 and 106 which are accessed from either side of the cart wherein each shelf is provided with its own two pole switch 104.

Figure 10:
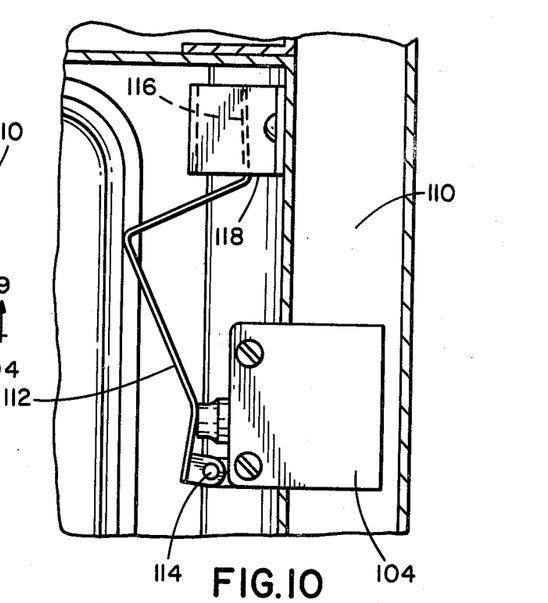
FIG. 10 is an enlarged plan view of FIG. 8.

FIG. 10 illustrates the position of the switch 104. The switch 104 is recessed into a wall 110 of the cart. A sensing lever 112 is pivoted on bearing 114 and its free end 116 is positioned within a shield 118 to prevent the lever from being distorted because of rough handling or during the cleansing of the interior portions of the cart.

Figure 7:
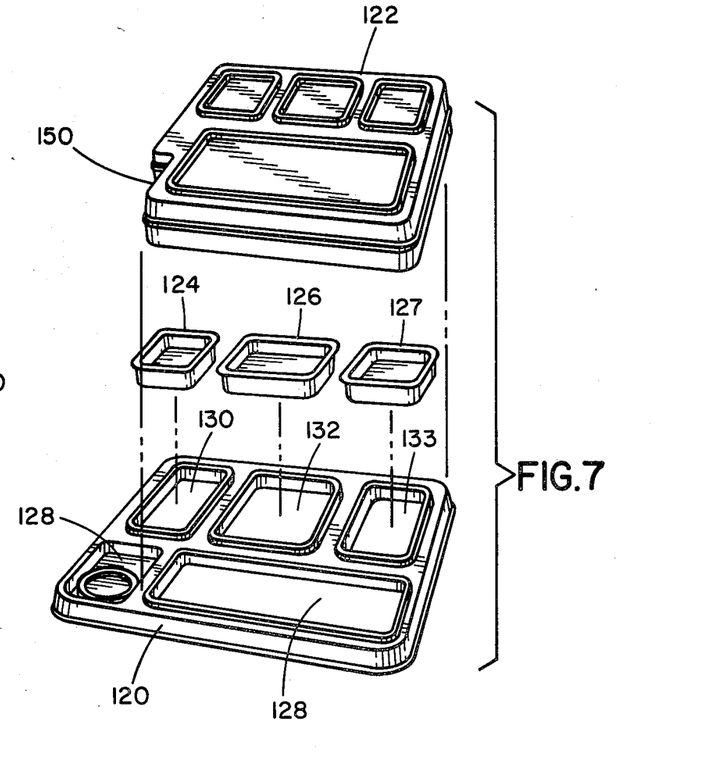
FIG. 7 is an exploded view of a service tray, insert dishes and cover.

A cooperating food service tray is best illustrated in FIG. 7. This consists of the service tray 120 itself, an insulating cover 122 and the food holding containers or dishes 124, 126 and 127. The tray 120 is formed with one or more recesses or compartments 128 to hold dishes, condiments, food eating implements or the like. In addition, one or more open bottom compartments 130, 132 and 133 are formed to receive the dishes 124, 126. The dimensional relationships are such that when the dishes 124, 126 are placed in the openings 130, 132 the bottoms of the dishes will extend below the bottom of the tray when the tray is not resting on a shelf 18 or other supporting surface.

Figure 9:
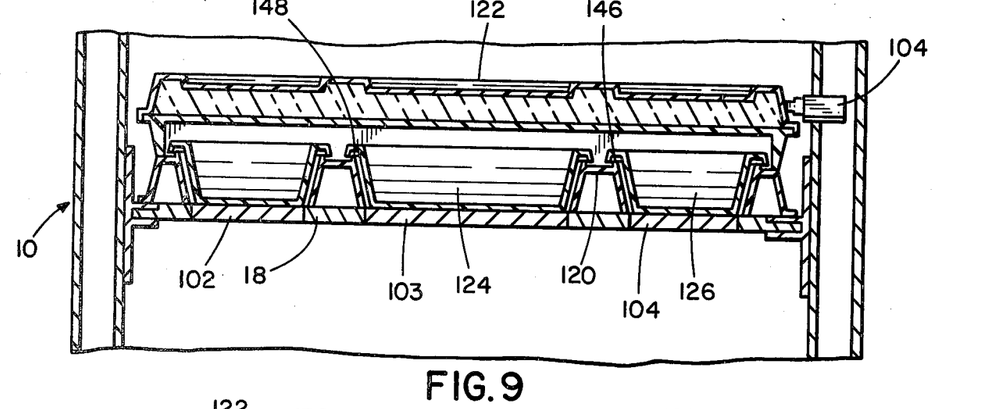
FIG. 9 is a cross-sectional view taken along lines 9—9 of FIG. 8.
Figure 11:
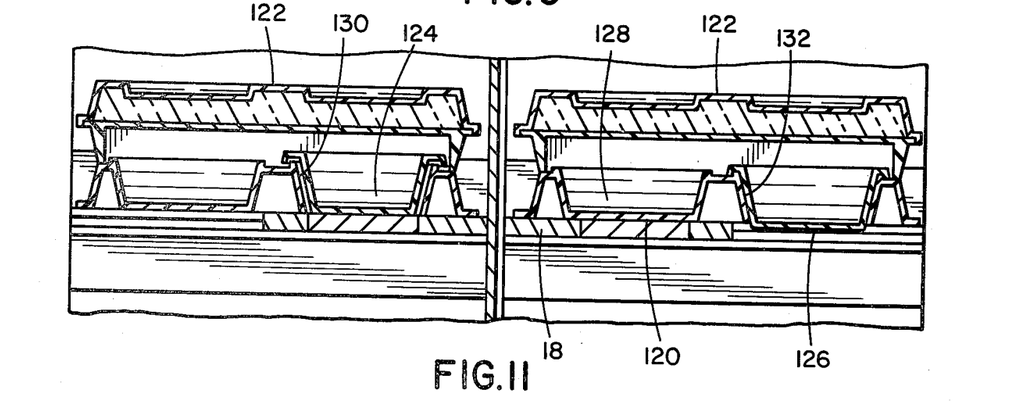
FIG. 11 is a cross-sectional view taken along line 11—11 of FIG. 8.

Referring specifically to FIG. 9, it will be noted resistance heating elements 102 and 103 are provided on the shelf immediately below the dishes 124 and 126. The height of the dishes is such that when the tray is placed on a shelf the heating areas on the shelf lift the containers away from the wall of the tray and thereby create the insulating spaces 146 and 148. This space prevents any other part of the tray from being heated by conduction of heat from the insertable container. As shown in FIG. 11, when there is no support under a dish such as 126 it is supported by engagement with the upper side of an opening such as 132.

The construction illustrated permits dishes to be loaded with food intended to be served hot to be placed in tray openings such as 130 or 132, while dishes holding food to be served cold placed in dishes which are inserted in compartments such as 128. The tray so loaded is then placed on a shelf 18 of the cart 10 and the cart rolled into the refrigerator 26, and the electrical connections to be described in detail below are effective as the desired time to heat the resistance heating elements 102, 103 to rethermalize the food in the dishes 124, 126. Because the heat is localized at the elements 102, 103 and the dishes being heated do not contact any portion of a tray 120 once they are on a shelf 18, heat transfer to other tray compartments holding dishes with food intended to be served cold is reduced.

The trays 102 and covers 122 are asymmetric, that is, each cover has a cut away portion 150 at which it does not completely overlie the tray. Referring to FIG. 9, it can be observed that when the tray is inserted with its covered right-hand side oriented toward the right side wall of the interior of the cart it will be proximate to switch 104. In this orientation the cover is disposed against the sensing lever 112. This will cause the lever to depress the switch 104 and thus complete an electrical circuit.

Figure 8:
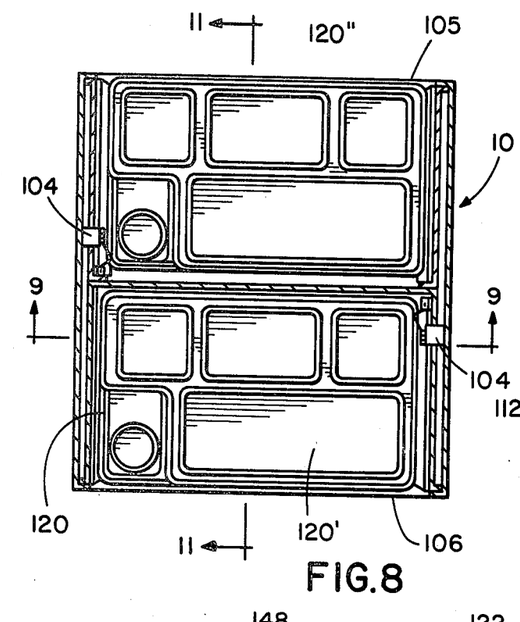
FIG. 8 is a plan view of two adjacent shelves of the cart with the food trays inserted.

The above described position is the orientation which will result in the activation at the desired time of the heating areas and it is the orientation of the tray and cover 120' on shelf 100 of FIG. 8. The alternate orientation of the tray is shown in FIG. 8 by the tray 120". It will be noted that the tray has been inserted so that no portion of the cover is disposed against the sensing lever of the switch 104. With the tray in this orientation the switch will not be closed and the food will not be heated when electrical power is applied to the cart.

The third subsection of the system is the timer-controlled electrical system. This electrical system includes electrical components which are mounted in the refrigerator, the electrical connection at the self-aligning coupling, and also the switches and heating areas located on the shelves of the cart. The operation of the entire system is best understood by referring to the schematic diagram at FIG. 12.

Figure 12:
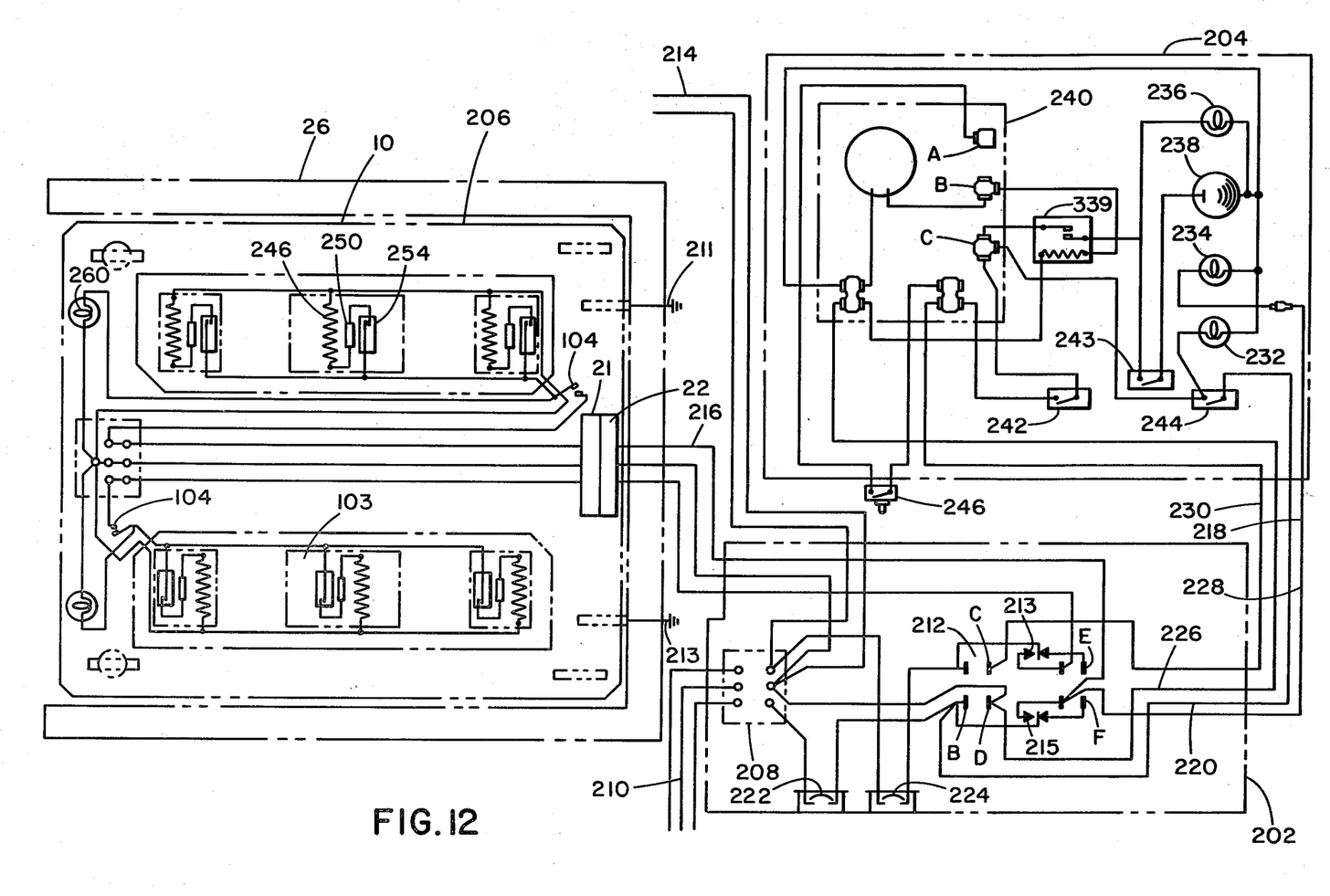
FIG. 12 is a schematic drawing of the electrical system of the invention.

The phantom lines on the schematic diagram circumscribe the components which are mounted in various subunits. The various subunits are the master relay-terminal block box which is mounted within the refrigerator and contains the components circumscribed by line 202; the control module which is mounted behind the control panel 29 and whose components are circumscribed by line 204; and the electrical components within the rolling cart 10 which are circumscribed by line 206. In FIG. 12 the cart is illustrated within the refrigerator 26. The male and female portions (22 and 21, respectively) of the electrical connector are shown in a mated position and provide three electrical contacts between the cart and the remainder of the system. The fourth electrical connection is provided by the grounding system associated with the self-aligning coupling and is represented in the schematic diagram as ground connections 211 and 213.

The master relay-terminal box contains terminal block 208 D.P.D.T. relay 212 and circuit breakers 222 and 224. The box is provided with two-phase 240 volt-30 amps service by power line 210. This line is attached to a terminal block 208 to provide two phases of power and a neutral connection. Power is provided to the refrigerator by power line 214 which is connected between the neutral and the second phase to provide 120-volt service. When the relay 212 is closed, its normally open contacts 213, 215 will close to provide power to the power cable 216 which is attached to the self-aligning coupling mounted on the rear wall of the refrigerator. The neutral circuit of this cable is connected to terminal block 208.

A control cable 218 provides the connections between the control module and the terminal. Line 220 of that cable is attached to lug B of the relay 212 and provides power to the control module while line 226 is attached to lug D of the relay and the neutral of the terminal block 208 and thus provides a neutral connection to the control module and the relay. Line 228 is connected to lug F of the relay and will provide power to the heater indicator lights whenever the relay 212 closes. Finally, line 230 is attached to lug C of the relay. When the control module applies a voltage to line 230, current will flow through the armature of the relay which is connected across lugs C and D and thus cause the contacts to close. This results in power being applied to the cart and line 228.

The control module is provided with a power on lamp 232, heater lamp 234, ready lamp 236, and Sonalert 238 which is connected in parallel with the ready lamp. All of these indicators are mounted on the control panel 29. Also mounted on the control panel are timer 240, momentary test switch 242, Sonalert on-off switch 243 and on-off switch 244. Mounted within the control module is a relay 239. A door switch 246 is not mounted at the control module but rather is positioned at the jamb of the refrigerator door. This switch is activated by the door so that its contacts are closed when the door is closed.

The timer which is used is one known in the art. Lugs A, B and C are all associated with the switches within the timer. The operation of these switches is as follows: The timer is provided with a dial rotated to an indicated amount of time to initiate operation. Switches within the timer will close and complete the circuit from lug C to their respective lugs A and B. The contacts of both these switches will remain closed as the timer counts down. At the 5-minute point, i.e., when all but the last five minutes of the preselected interval time has passed, the switch connecting lug A to lug C will open. However, the switch connected between lug C and lug B will remain closed for the duration of the interval and will not open until the timer reaches "zero".

When the food in the cart is to be rethermalized, the electrical timing system can be operated as follows: The power switch 244 is closed and will provide a voltage to the power lamp indicator 232 and also apply a voltage to lug C of the timer. The normally closed contacts of relay 239 will supply power to the ready light 236 and the Sonalert 238 to remind the operator to set the timer. The timer should be set to a predetermined time—for example, 40 minutes. This will close the switch between lug C and lug A and thus supply power to the lug C of the relay 212 through the door switch 246. This lug will thus activate the relay armature by means of line 230. Power will be thus supplied to the cart via power line 216.

The switch connecting lugs A and C of the timer will remain closed for 35 minutes until the last five minutes of the countdown. At the 5-minute mark that switch will open and thus cause the armature of the relay 212 to be deactivated and remove the power applied to the coupling and cart. Once the timer has been set, the switch between lugs C and B will close and activate the armature of relay 239 to open the normally closed contacts. Hence, power is no longer applied to the ready lamp or Sonalert. When the countdown is complete, the switch between lugs B and C will open and thus deactivate the armature of the relay 239 and thereby apply power to the ready lamp and Sonalert. This will alert the operator to turn the power switch off and remove the cart from the refrigerator.

If the cart is not removed at the end of the rethermalization cycle and the unit remains unattended the timer will automatically enter a "keep warm" mode after a selected time interval. In this mode power will be supplied to the cart for brief intervals for a predetermined period of time to maintain the rethermalized food at desired serving temperatures until the cart is removed and food service commenced.

It will be noted that the door switch 246 is connected in series with the lug A and lug C of the relay 212. Since the switch is closed only when the door of the refrigerator is closed, it will prevent any power from being applied to the cart while the refrigerator door is open. If the main power switch 242 is closed and the test switch is closed it will apply power to the armature of the relay and momentarily energize the circuit to the cart. This is so that the operator can view the shelf status lamps 260 which are mounted on the side of the cart facing the refrigerator's doorway. These lamps can be seen in FIG. 5, and when lit indicate that a tray is properly oriented on a shelf for energization.

Although the timing circuits will determine whether and for how long power is applied to the cart, the circuitry within the cart determines which shelves are to be heated. Referring to the left-hand side of FIG. 12, the electrical system of two adjacent shelves of the cart is illustrated.

Each shelf is provided with heating areas 102, 103 and 107, each having a resistance heating element 246, for instance, a thermal fuse 250 and a thermostatic switch 254. The heating areas are connected in parallel as is indicator lamp 260. The heaters and lamp are connected in parallel with switch 104. If this switch is closed due to the action of the cover, it will apply power to the heaters and the status lamps 260.

The operation of the entire system will take place as follows: Kitchen personnel assemble meals and place the courses to be served hot within the insertable containers 124 and 126. Courses not requiring heating should be placed in area 128. When such a meal is to be inserted within the cart the tray should be oriented so that the cover will be disposed against the switch 104. If the entire meal is not to be heated, any or all the compartments may be used so long as the tray is inserted into the cart so that the cover is not disposed against the switch. When the cart has been filled with trays, the strap 17 should be secured to keep the trays from inadvertently falling out of the cart. The collapsible shelf 14 mounted on the front panel should be moved to its folded position.

The cart is then placed in the refrigerator to preserve the food. The cart 10 is wheeled up to the open doorway of the refrigerator and positioned squarely to it. As the cart is pushed into the refrigerator the wheels are directed by the guide flanges 30 and 32 to insure proper insertion. As the cart moves further toward the back of the refrigerator the alignment tubes will center in the tapered bushings and the self-aligning coupling will engage and finally the electrical connectors will mate with each other.

Before closing the refrigerator door, the operator should turn the on-off switch 244 to the "on" position. This will cause the ready light 232 to activate. With the refrigerator door open the test switch is closed to temporarily apply power to the cart. The operator should check that the proper indicator lamps are illuminated on the cart. An electrical or mechanical fault is indicated if a lamp fails to illuminate on a shelf which contains food which is to be rethermalized. When the operator is satisfied that the system is working properly he can return the power switch to the "off" position and close the door of the refrigerator.

The cart and food will remain in the refrigerator for an extended period of time. At some time, for instance, 40 minutes before the meals are to be served, food service personnel can, with door closed, turn the power switch 244 in the "off" position. Switch 243 is then closed. The timer should then be moved to a predetermined setting. Typically, a setting of 40 minutes is proper for most foods which need heating. At 40 minutes prior to mealtime the power switch 242 is closed and the timer will apply power to the cart's heating areas for the first 35 minutes of the countdown. After this period of time, the power will be removed from the heaters. A 5-minute standing time is provided to allow an even distribution of heat within each insertable container. Five minutes after the power to the cart has been interrupted, the Sonalert and ready light will be automatically activated to indicate that the cart is ready for removal from the refrigerator.

The food service personnel need only open the refrigerator door, unlock the lockable wheels, and remove the cart from the refrigerator.

The cart can be rolled to the area where the food is to be served, for example, a particular ward in the hospital. Once at that location, the tray retaining strap is unfastened and the trays delivered to each patient. The lockable wheels 13 may be utilized to prevent the cart from rolling while unattended. The collapsible shelf 14 can be utilized to facilitate the assembly of the meals.

While we have shown and described embodiments of this invention in some detail, it will be understood that this description and illustrations are offered merely by way of example, and that the invention is to be limited in scope only by the appended claims.

What is claimed as new and desired to be secured by Letters Patent is:

1. In apparatus for storing, refrigerating and heating food items, including covered trays, a movable cart having a plurality of shelves to receive the trays, a refrigerator for receiving the cart with trays therein, and wherein said trays are formed with dish holding compartments and openings for receiving other dishes and said shelves have electrical heating areas positioned under said openings and dishes in said openings are disposed thereon to be heated before serving, the improvement in an electrical control and supply apparatus for the heater areas comprising: a switch means adjacent to each of the one or more shelves to control the application of electrical power to the heating areas of said shelves, said switch means including a sensing lever having a free end projected into an area above the shelf where a covered tray placed on a shelf may engage a sensing lever to operate said switch means, wherein a cover for each tray extends over a portion of each tray whereby when a covered tray has a first orientation on a shelf the cover will engage said sensing lever to actuate said switch means, and when a covered tray has a second orientation on a shelf the cover will not engage said sensing lever.

2. The invention according to claim 1 wherein said electrical control and supply apparatus includes a coupling system for providing electrical connections between the movable cart and the refrigerator comprising: a first electrical connector mounted on the back wall of said refrigerator; a second electrical connector positioned to mate with said first electrical connector mounted on said movable cart; guide means mounted on said back wall and extending perpendicular thereto; and cooperating guide means mounted on said movable cart and dimensioned to engage said first mentioned guide means whereby as the movable cart is brought into proximity of the back wall of said refrigerator said first mentioned guide means will engage said cooperating guide means and thereby align the movable cart so that said first and second electrical connectors will mate as the cart is moved into the refrigerator.

3. The invention according to claim 2 wherein said first mentioned guide means is constituted by tubes mounted on either side of said first electrical connector and said cooperating guide means includes horizontally extending pins mounted at one end on either side of said second electrical connector engageable inside said tubes.

4. The invention according to claim 3 wherein each cooperating guide means has a bushing movable on an associated pin and spring means urging the bushing toward the free end of the pin.

5. The invention according to claim 2 wherein said first mentioned guide means and said cooperating guide means are formed of electrically conductive materials and are dimensioned to engage each other prior to any engagement of said first and second electrical connectors to provide for the electrical grounding of the cart before an electrical connection is made thereto.

6. The invention according to claim 3 wherein said movable cart is provided with further guide means, each including an alignment bushing having a conical surface with a narrow end and a wide end to receive said tube and positioned to be coaxial with said pin with its narrow end proximate to the free end of the pin, and its wide end is positioned away from the pin whereby as the cart is brought into the proximity of said lower back wall the conical surface of the alignment bushing will engage the tube and thereby urge the cart into a position where the free end of the tube is received through the opening at the narrow end of the alignment bushing and the pin directed inside the tube to align said electrical connectors.

7. The invention according to claim 2 wherein said second electrical connector is movably mounted on said cart to accommodate itself to the position of said first electrical connector.

8. The invention according to claim 2 wherein said second electrical connector is movably mounted on said cart to accommodate itself to the position of said first electrical connector.

* * * * *